Feb. 24, 1970     W. C. RIESTER ETAL     3,496,872
ROTARY MOTOR DRIVEN PUMP
Filed May 31, 1968
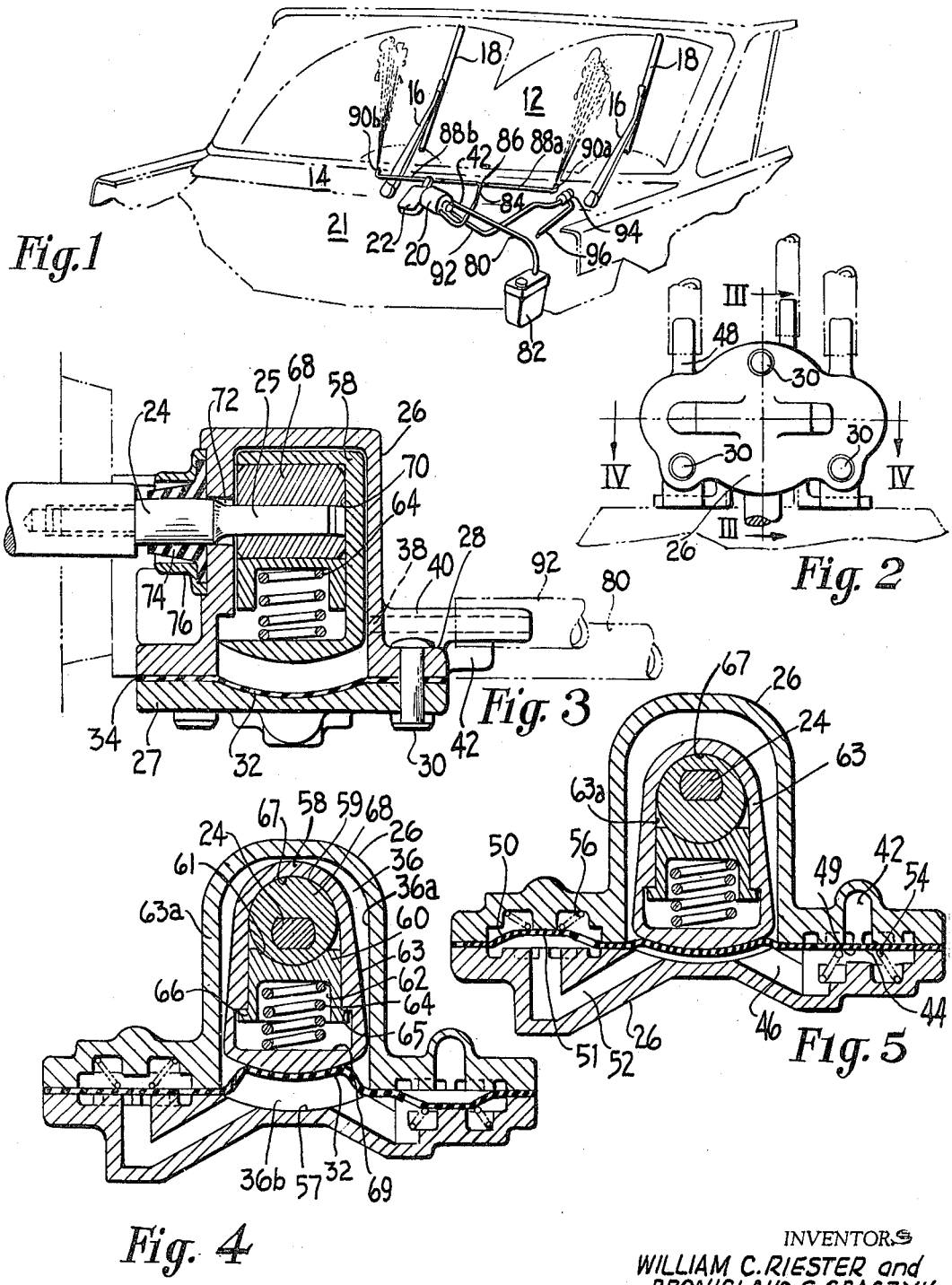
INVENTORS
WILLIAM C. RIESTER and
BY BRONISLAUS S. GRACZYK
E. Herbert Liss
ATTORNEY.

United States Patent Office 3,496,872
Patented Feb. 24, 1970

3,496,872
ROTARY MOTOR DRIVEN PUMP
William C. Riester, Williamsville, and Bronislaus S. Graczyk, Snyder, N.Y., assignors to Trico Products Corporation, Buffalo, N.Y.
Filed May 31, 1968, Ser. No. 733,391
Int. Cl. F04b 49/02, 43/02; B60s 1/02
U.S. Cl. 103—23                                    6 Claims

ABSTRACT OF THE DISCLOSURE

Windshield wiper pump apparatus of the diaphragm type in which the diaphragm is driven by a cam follower to effect intake and high velocity pulse-type discharge of fluid. A cylindrical cam is eccentrically received on a shaft extension of a windshield wiper motor and causes the cam follower to reciprocate within the pump housing through a pressure limiting spring assembly. Vacuum applied to one side of the diaphragm through a manual control draws the diaphragm into engagement with the cam follower. Venting through the manual control relaxes the diaphragm to interrupt pumping action when the wiper motor is operating.

BACKGROUND OF THE INVENTION

The invention relates to windshield cleaning devices and more particularly to a cam operated washer pump. This type of pump includes a piston, diaphragm or other reciprocating element driven by a suitable cam element to effect alternating intake and discharge strokes. Prior art devices are known in which a separate, external cam mounted on an adjacent rotatable or reciprocating or oscillating member is utilized to drive the pumping element. An example of such a pump is described in U.S. Patent 3,209,384 by A. R. D'Alba, issued Oct. 5, 1965. The separate cam driver and pump require accurate alignment during mounting of the pump in assembly.

Further, it is essential that means be provided in pump mechanisms utilized in automobile windshield washer systems for preventing damage to the pump and discharge conduits due to freezing of the washer fluid in either the pump or the discharge lines. Sufficient force is provided by the motor to break the pump shaft, to burst the pump housing or conduits or to damage other components if freezing of accumulated washer solvent in the discharge portion of the cleaning system should occur.

In a moving vehicle, the air stream, particularly during high speed driving, tends to drive the washer solvent discharge away from the windshield necessitating a high speed discharge from the nozzles.

SUMMARY

The pump apparatus of the present invention overcomes the freezing problem by the provision of a spring assembly providing self-limiting pressure regulation means. When the reactive force on the pump piston or diaphragm is in excess of the tension on the coil spring, the cam will idle relative to the cam follower. This spring assembly in addition to avoiding damage due to freeze-up inherently limits the discharge pressure to a desired value.

Alignment problems are overcome and a compact structure is provided by utilization of an internal, self-contained cam journaled within a shell type cam follower.

The pump of the present invention delivers a high velocity pulse type of jet to overcome air stream during high speed driving. This is achieved by the low volume of the pump coupled with high frequency of vibrations of the diaphragm.

The principal object of the present invention is to provide improved pumping apparatus for windshield washing systems in motor vehicles which is compact, economical, facilitates assembly and which obviates damage due to freezing of the solvent and which delivers a high velocity pulse type of jet.

Other objects and advantages of the invention will be apparent from the following detailed description taken in connection with the accompanying drawings.

BRIEF DESCRIPTION OF THE DRAWINGS

FIG. 1 is a fragmentary prospective view of a motor vehicle incorporating the windshield cleaning system of this invention;

FIG. 2 is an elevational view of the pump apparatus of this invention;

FIG. 3 is a cross sectional view of the pump taken on line III—III of FIG. 2 looking in the direction of the arrows;

FIG. 4 is a cross sectional view of the pump taken on line IV—IV of FIG. 2 looking in the direction of the arrows; and FIG. 5 is a view similar to FIG. 4 showing the pump at the end of a discharge stroke.

DESCRIPTION OF THE PREFERRED EMBODIMENT

In FIG. 1 there is shown a fragmentary view of a motor vehicle 10 which includes a windshield 12 and a cowl 14. Suitably mounted on the cowl are a pair of pivot shaft assemblies, not shown. Mounted on each pivot shaft for movement there with is a wiper arm 16. Each of the wiper arms have mounted at their free ends wiper blades 18 of suitable construction. A motor 20 which may be of any suitable type, here shown as an electric motor including a gear box 22, is mounted on the fire wall 21 of the vehicle below the cowl. The motor may be an electric motor, as shown, or any other suitable or desirable type as, for example, vacuum or hydraulic. The motor includes an output shaft at the gear box connected to the wiper arm pivot shaft assemblies through a suitable transmission linkage assembly, not shown. Projecting from the end of the motor remote from the gear box 22 may be a stub shaft 24 for driving the pump in a manner to be described hereinafter.

The washer pump includes a pump housing 26 having a closure cap 27 secured to a peripheral flange 28 of the pump housing in any suitable manner as, for example, by riveting as at 30. A movable wall element, shown by way of illustration as a diaphragm 32, has its peripheral edge 34 clamped between the flange 28 and the closure cap 27 to divide the interior chamber 36 of the housing 26 into compartments 36a and 36b. Although the movable wall element is shown as diaphragm 32, it will of course be understood that in accordance with the broader aspects of the invention other suitable and desirable types of reciprocable wall elements may be employed as, for example, a piston.

A passage 38 terminating in a nipple 40 communicates with compartment 36a through housing 26. Intake passage 42, formed in the flange 28, communicates through a check valve assembly 44 and a conduit 46 formed in the closure cap 27 with compartment 36b. Discharge passage 48 formed in flange 28 communicates through a check valve assembly 50 and a conduit 52 formed in closure cap 27 at compartment 36b. The check valve assemblies 44 and 50 include flap type valves 49 and 51, respectively, spring biased to closed position by tapered coil springs 54 and 56, respectively. Conveniently the flap valves 49 and 51 are formed in the peripheral portion of the diaphragm 34.

Disposed within the housing 26 is a cam follower 58 of shell-like configuration open on one lateral side thereof. The lower, outer surface 59 of the cam follower 58 adjacent the diaphragm 32 may be a partial convex spherical surface conformable with a complementary concave surface 57 formed on the adjacent side of the closure cap 27. Disposed for reciprocation and conformable with opposed interior surfaces of the side walls 63, 63a of cam follower 58 is a spring retainer 60. Follower 58 is formed with a partial cylindrical internal surface 67. The spring retainer 60 has a cylindrical surface 61 disposed in opposition to the cylindrical surface 67 of the cam follower 58. On the side opposite the cylindrical surface 61 is a recess 62 having a coil spring 64. The coil spring 64 is disposed intermediate a flat interior end wall 69 of the cam follower and the spring retainer 60 within the recess 62. The opposed sidewalls 63, 63a of the cam follower 58 are each formed with a downwardly facing shoulder 65 as shown in FIGS. 4 and 5. The spring retainer 60 includes an outwardly extending annular flange 66 at its lower edge which engages shoulder 65 to thereby limit the movement of the spring retainer 60.

Journaled between the opposed cylindrical surfaces 67 and 61 on the cam follower 58 and spring retainer 60 respectively is a cylindrical cam 68. The cam 68 has formed therethrough an off center opening 70 which includes a pair of opposed flat surfaces for receiving a complementary shaped stem 25 formed on the stud shaft 24 of the motor 20. A circular opening 72 is provided in the housing in alignment with the opening 70 of the cam 68. To prevent leakage where the shaft 24 enters the housing 26 through the opening 72, a gland seal 74 is provided and is retained by a gland seal retainer 76. The pump housing 26 may be affixed to the end of the motor housing in any suitable manner as by bolts or rivets.

The intake passage 42 is connected through a conduit 80 to a solvent reservoir 82 mounted in a suitable manner and at a convenient location within the engine compartment of the motor vehicle 10. The discharge passage 48 is connected through a conduit 84, a T 86 and a pair of conduits 88a and 88b to discharge nozzles 90a and 90b respectively. The discharge nozzles 90a and 90b are mounted conveniently adjacent the windshield 12 to project solvent against the windshield. The port or passage 38 and nipple 40 are connected through conduit 92, a manually operated control valve 94 and a conduit 96 to a convenient source of vacuum as, for example, the intake manifold of the engine (not shown). The control 94 may be mounted on the dash of a motor vehicle within the passager compartment at a location convenient to the operator of the vehicle. The control 94 may be of any suitable type which effects communication between conduit 96 and conduit 92 in an "on" position and interrupts such communication in the "off" position and connects conduit 92 to an atmospheric vent. The control 94 may if desired, be of the type which effects coordination of motor and pump operation, i. e., moving the control 94 to the "on" position also energizes the wiper motor.

The operation of the cleaning system should now be apparent. In order to initiate a conjoint wiper-washer operation the cotnrol 94 is turned to the "on" position thereby effecting vacuum communication with compartment 36a of the pump housing and at the same time energizing motor 20 to cause rotation of the shaft 24 and oscillation of the wiper arms and blades. Vacuum supplied to chamber 36a draws diaphragm 34 to the position seen in FIG. 4 where it is engageable with the cam follower 58. The cam 68 rotates with the shaft 24 and due to the eccentricity of its mounting reciprocates the cam follower through spring retainer 60 and spring 65. The tension of spring 64 is of such a value as to cause the follower to move and to impress a limited force upon the diaphragm 32. When the reaction force exceeds a preselected value the spring 64 will compress and the spring retainer 60 will move relative to or reciprocable within the cam follower 58. Thus no movement of the diaphragm will occur. As the cam 68 continues to rotate the cam follower will reciprocate up and down from a position shown in FIG. 4 to the position shown in FIG. 5 which in turn will move the diaphragm up and down from the position shown in FIG. 4 to the position shown in FIG. 5. When the diaphragm moves upwardly solvent is drawn from the reservoir 82 into the chamber 36b to the check valve 44. When the diaphragm moves to the position shown in FIG. 5 solvent is discharged at conduit 52, check valve 50, discharge passage 48, conduit 84, T 86, conduits 88a and 88b through nozzles 90a and 90b to the windshield.

When it is desired to cease pump operation manual control 94 is returned to the venting position permitting atmosphere to flow through the control 94, conduit 92, nipple 40 and port 38 to chamber 36b, thereby relaxing the diaphragm; the diaphragm then remains in a position where it is not engageable with cam follower 58. It is apparent then that the wiper motor may continue to operate while the pump idles.

It should be noted that it is not necessary to continuously impress vacuum pressure upon chamber 36a to maintain pump operation. Vacuum pressure is only necessary to initiate operation and so long as the compartment 36a then remains sealed from the atmosphere, pump operation will continue.

The pump, particularly when utilized with an electric motor, delivers a high velocity pulse type jet because a wiper motor may operate at 2,000 to 3,000 r.p.m. and because of the low volume of the pump.

It should now be apparent that an improved windshield cleaning system has been provided which is of simple but rugged construction, which is compact and self-contained, which includes means for self-limiting the pressure imposed on the washer system, and which has few moving parts. A certain specific embodiment of the invention has been described for the purpose of illustration but it will be apparent that various modifications and other embodiments are possible within the scope of the invention. It is to be understood, therefore, that the invention is not limited to a specific arrangement shown but in its broadest aspect it includes all equivalent embodiments and modifications which come within the scope of the invention.

What is claimed is:

1. A windshield washer pump for motor vehicles comprising a housing having a chamber, movable wall means dividing said chamber into a first compartment and a second compartment, a cam and cam follower assembly disposed within said first compartment comprising a cam follower reciprocable within said first compartment, a cam operatively engageable with said cam follower, means for operatively connecting said cam to a motor shaft for rotation therewith, control means for selectively positioning said movable wall into continuous engagement with said cam follower and free from engagement therewith, a solvent intake port and a solvent discharge port whereby upon activating said control means to position said movable wall into continuous engagement with said cam follower, said cam follower drives said movable wall in response to motor operation to thereby effect alternate intake and discharge pump strokes.

2. Windshield washer pump for motor vehicles according to claim 1 wherein said cam and follower assembly includes a resilient means for limiting pressure impressed upon said movable wall be said cam follower, disposed intermediate said cam and said cam follower.

3. A windshield washer pump for motor vehicles according to claim 1 wherein said control means comprises a port for selectively effecting communication between a vacuum sources and said first compartment to initiate pumping action and between an atmospheric vent and said first compartment to interrupt pumping action.

4. A windshield washer pump for motor vehicles according to claim 1 wherein said cam and follower assembly comprises a substantially cylindrical cam eccentrically mounted on the motor shaft for rotation therewith, a cam follower of open shell configuration having a first inner surface at one end of complementary curvature to the lateral surface of said cam, a spring retainer having a second surface of complementary curvature to the lateral surface of said cam disposed in opposition to said inner surface of said cam follower, said cam being journaled for rotation between said opposed first and second surfaces, said spring retainer being reciprocable within said cam follower and a compression spring disposed between said spring retainer and a third inner surface of said cam follower opposite said first inner surface whereby the eccentricity of said cam applies a force against said third inner surface through said spring retainer and compression spring effective to reciprocate said cam follower when the motor shaft rotates, the pressure thus applied to the movable wall being self-limiting.

5. A windshield washer pump for motor vehicles according to claim 4 wherein said control means comprises a port for selectively effecting communication between a vacuum source and said first compartment to initiate pumping action and between an atmospheric vent and said first port to interrupt pumping action.

6. A windshield washer pump for motor vehicles according to claim 1 wherein said movable wall comprises an elastic diaphragm.

References Cited

UNITED STATES PATENTS

| | | |
|---|---|---|
| 1,905,284 | 4/1933 | Heitger. |
| 2,367,545 | 1/1945 | Udale. |
| 2,432,798 | 12/1947 | Pratt et al. |
| 2,895,424 | 7/1959 | Tramontini et al. _____ 103—150 |
| 2,980,032 | 4/1961 | Schneider _____ 103—150 |
| 3,171,154 | 3/1965 | Lovell _____ 15—250.02 |

FOREIGN PATENTS 1,184,447  12/1964  Germany.

WILLIAM L. FREEH, Primary Examiner

U.S. Cl. X.R.

103—150; 15—250.02

P-1050
(5/69)

UNITED STATES PATENT OFFICE
CERTIFICATE OF CORRECTION

Patent No. 3,496,872      Dated February 24, 1970

Inventor(s) William C. Riester, et al

It is certified that error appears in the above-identified patent and that said Letters Patent are hereby corrected as shown below:

Col. 3, line 63, "cotnrol" should be --control--.
Col. 4, line 69, "be" should be --by--.
       line 75, "sources" should be --source--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents